W. S. Hicks.
Pen & Pencil Case.
No. 2,477. Reissued Feb. 12, 1867.
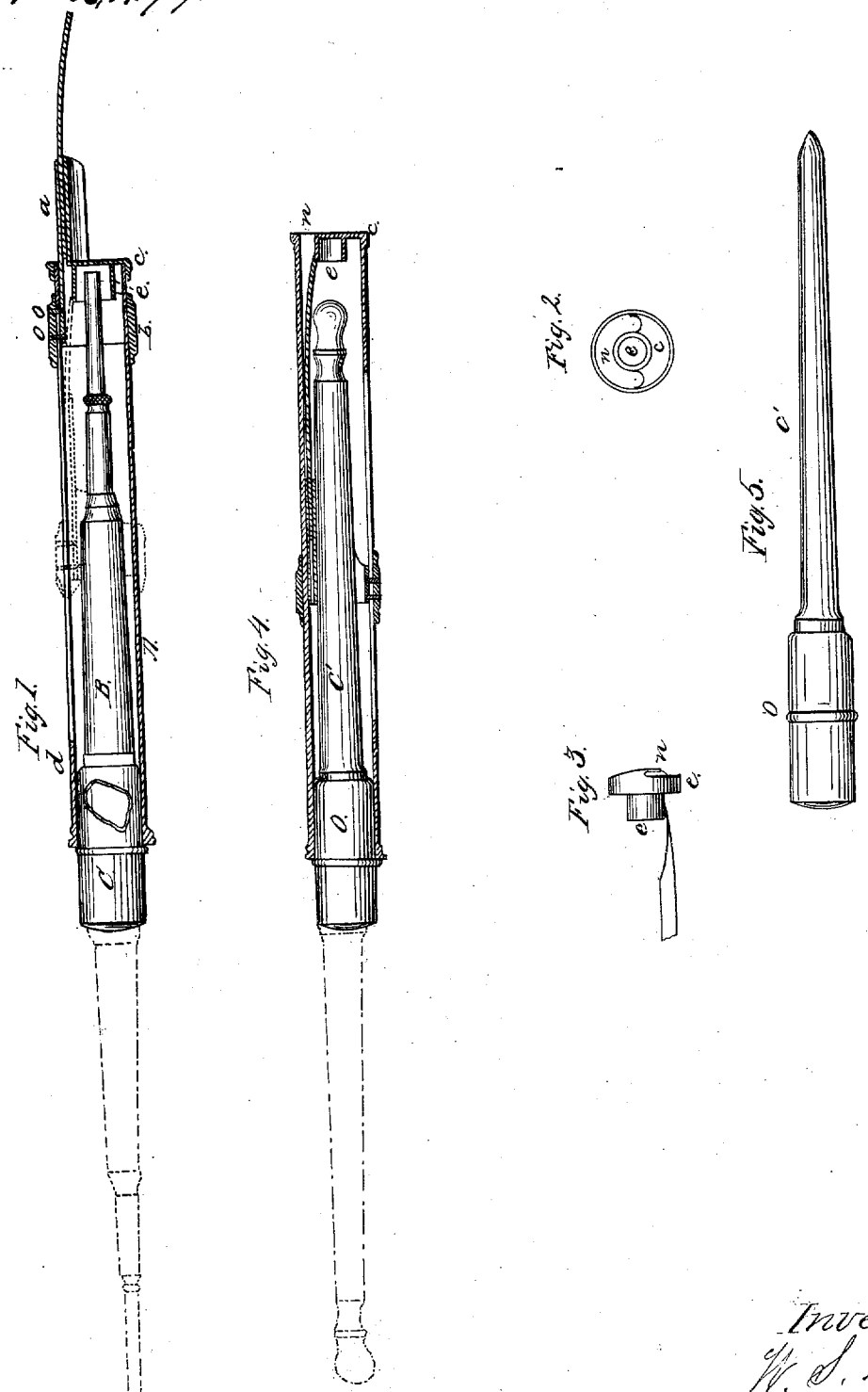
Witnesses.
P. T. Dodge
Geo. Burgess
Inventor
W. S. Hicks
By his atty.
M. Dodge
N. PETERS, PHOTO-LITHOGRAPHER, WASHINGTON, D. C.

United States Patent Office.

WILLIAM S. HICKS, OF NEW YORK, N. Y.

*Letters Patent No.* 49,878, *dated September* 12, 1865; *reissue No.* 2,477, *dated February* 12, 1867.

PEN AND PENCIL CASE.

The Schedule referred to in these Letters Patent and making part of the same.

TO ALL WHOM IT MAY CONCERN:

Be it known that I, WILLIAM S. HICKS, of New York, in the county of New York, and State of New York, have invented certain new and useful Improvements in Pen-Holders; and I do hereby declare that the following is a full, clear, and exact description thereof, reference being had to the accompanying drawings, making part of this specification, and to the letters of reference marked thereon, like letters indicating like parts, wherever they occur. To enable others skilled in the art to construct and use the invention, I will proceed to describe it.

My invention consists in making a case for holding a metallic pen, that shall consist of a single tube, sufficiently short to be carried conveniently in the pocket, and having a reversible pencil or handle, by which it can be used as a desk pen at will. It further consists in providing the end of the case with a cap of novel construction, with a small inner tube to serve as a protection for the points of the pen, and also of the pencil, in case one be used.

Figure 1 is a longitudinal section.

Figure 2 an end view.

Figure 3, a view of the cap and inner tube detached; and

Figures 4 and 5, views of the same with a handle substituted for the pencil.

A represents the case, which may be made of any suitable material, such as gold, silver, hard rubber, &c., and is left entirely open at its upper end. Within this case is placed the pen-holder proper, *a*, which is made tubular, so that it may slide back to withdraw the pen in the case, and in so doing, slide over the pencil or handle, when the latter is inserted, as shown in figs. 1 and 4, it being secured to the sliding ring or boss by screws, *o*, in the usual manner. Upon the lower end of the case A is secured the cap *c*, which entirely encloses the lower end of the case A, there being a curved opening, *n*, made in it, for the pen-holder *a*, with the pen, to pass through when the latter is shoved out for use, as shown in fig. 1. To the inside of this cap *c* a short tube, *e*, is secured in such a manner as to project up into the interior of the case A a short distance, as shown in section in figs. 1 and 4, the form of the cap and tube being shown in fig. 3; fig. 2 being an end view of the same, and showing the opening *n* through which the pen projects. The object or office of this cap and tube is threefold: first, to strengthen the case, and prevent it from being crushed or bent, whereby the pen would become injured; second, and mainly to form a support for the points of the pen when it is drawn within the case. If the tube *e*, or some equivalent device, were not used, the points of the pen, when drawn in, would be apt to spring down, and then when an effort was made to shove the pen out, its points would strike against the inside of the cap *c*, and not only injure it, but also prevent it from being shoved out. By attaching the tube *e* so as to come flush with the edge of the opening *n*, the points of the pen are prevented from catching against the end piece, and can thus be shoved out and in without difficulty, and at the same time permit the end of the case to be more nearly closed than it otherwise could be. The third object is to form a receptacle for the point of the pencil, as shown in fig. 1, and thus prevent it from becoming soiled by contact with the pen, on which more or less ink is apt to remain. The pencil B is made in the usual manner, except that it is longer, so that when reversed, as shown in red, in fig. 1, it, with the case A, will form a rigid handle of proper length for convenient use as a pen-holder for writing. The upper end of the pencil is made hollow to form a receptacle for the leads or points, the cap C screwing on to the pencil B, the point being at *d*, fig. 1, a portion being broken away to show the cavity within. It is obvious that instead of the pencil B, a reversible handle, C′, may be used, as shown in fig. 4, the handle being shown detached in fig. 5. This handle may be made of wood or hard rubber. Upon the end of the handle, where it is inserted in the case A, a metallic cap, O, is secured, for the double purpose of preventing the handle from varying in size by swelling or shrinking of the wood, and thus becoming loose when inserted or too large to be inserted readily, and also for rendering it more finished and ornamental in appearance. If desired, the cap and tube may be omitted, especially when the wooden handle is used, and thus furnish a still cheaper style of the article. In all cases, however, it is indispensable that the slide to which the pen is attached should be tubular, so as to leave an open space in the interior for the handle to occupy when reversed and inserted. In the ordinary pen-holder, the handle cannot be reversed, for the reason that the slide to which the pen is attached is formed in such a manner as to close the space inside of the case A, and thus prevent the handle from entering the case A when the pen is shoved in or, if the handle be first inserted, then the pen cannot be shoved in. By my method of constructing the parts, I am enabled to furnish a very light, cheap article, and that combines all the advantages of a pocket and also a desk pen-holder.

Having thus described my invention, what I claim, is—

1. The case A, consisting of a simple tube, provided with the cap *c*, and short inner tube *e*, arranged as set forth.

2. In combination with a case consisting of a single tube, I claim the reversible handle, substantially as set forth.

WM. S. HICKS.

Witnesses:
JOHN DUTCHER,
W. H. SEMBLER.